(12) United States Patent
Yamaoka et al.

(10) Patent No.: US 9,199,326 B2
(45) Date of Patent: Dec. 1, 2015

(54) WIRE ELECTRIC DISCHARGE MACHINE AND AUTOMATIC PROGRAMMING DEVICE FOR WIRE ELECTRIC DISCHARGE MACHINE

(71) Applicant: FANUC CORPORATION, Yamanashi (JP)

(72) Inventors: Masahide Yamaoka, Yamanashi (JP); Yasuo Arakawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 202 days.

(21) Appl. No.: 13/937,980

(22) Filed: Jul. 9, 2013

(65) Prior Publication Data
US 2014/0014625 A1    Jan. 16, 2014

(30) Foreign Application Priority Data
Jul. 10, 2012    (JP) ................. 2012-154986

(51) Int. Cl.
*B23H 7/20*    (2006.01)
*B23H 7/02*    (2006.01)
*B23H 1/04*    (2006.01)
*B23H 7/06*    (2006.01)
*G05B 19/4093*    (2006.01)

(52) U.S. Cl.
CPC ................. *B23H 1/04* (2013.01); *B23H 7/065* (2013.01); *B23H 7/20* (2013.01); *G05B 19/40931* (2013.01); *G05B 2219/45221* (2013.01)

(58) Field of Classification Search
CPC ............ B23H 7/02; B23H 1/04; B23H 7/065; B23H 7/20; G05B 2219/45221
See application file for complete search history.

(56) References Cited

U.S. PATENT DOCUMENTS

| 4,652,716 | A | * | 3/1987 | Schneider et al. | ......... 219/69.12 |
| 5,242,555 | A | * | 9/1993 | Buhler | ......... 219/69.12 |
| 5,556,554 | A | * | 9/1996 | Morishita | ......... 219/69.12 |
| 6,832,126 | B2 | * | 12/2004 | Irie | ......... 219/69.12 |
| 2008/0201010 | A1 | * | 8/2008 | Takagi et al. | ......... 219/69.12 |
| 2012/0193326 | A1 | * | 8/2012 | Mitsuyasu | ......... 219/69.17 |

FOREIGN PATENT DOCUMENTS

| EP | 692333 A1 | 1/1996 |
| JP | 5796724 A | 6/1982 |
| JP | 62218024 A | 9/1987 |
| JP | 3-049833 A * | 3/1991 |

(Continued)

OTHER PUBLICATIONS

Office Action mailed Aug. 6, 2013 corresponds to Japanese patent application No. 2012-154986.

*Primary Examiner* — Geoffrey S Evans
(74) *Attorney, Agent, or Firm* — Hauptman Ham, LLP

(57) ABSTRACT

In a wire electric discharge machine or an automatic programming device for a wire electric discharge machine, in which a core is held with a workpiece base material by attaching brass contained in a wire electrode to the machining groove during machining, an attachment/deposition region where machining chips containing brass produced during machining are attached and deposited to the workpiece is set based on a machining shape obtained from a machining program and the machining chips containing brass produced during machining are attached and deposited according to the set attachment/deposition region.

7 Claims, 9 Drawing Sheets

(56) References Cited

FOREIGN PATENT DOCUMENTS

| JP | 52823 U | 1/1993 |
| JP | 08-019918 A * | 1/1996 |
| JP | 825145 A | 1/1996 |
| JP | 2013144335 A | 7/2013 |

* cited by examiner

WIRE ELECTRIC DISCHARGE MACHINE AND AUTOMATIC PROGRAMMING DEVICE FOR WIRE ELECTRIC DISCHARGE MACHINE

RELATED APPLICATIONS

The present application is based on, and claims priority from, Japanese Application Number 2012-154986, filed Jul. 10, 2012, the disclosure of which is hereby incorporated by reference herein in its entirety.

BACKGROUND OF THE INVENTION

1. Field of the Invention

The present invention relates to a wire electric discharge machine and an automatic programming device for a wire electric discharge machine that have an anti-drop function for a workpiece by attaching an electrode component to the workpiece.

2. Description of the Related Art

Descriptions are given to machining in a case of carrying out die machining with a wire electric discharge machine using FIG. 8 taken from above of a workpiece.

The machining starts from a machining start hole 15 with a wire electric discharge machine. In a machining path through which a wire electrode 13 has gone, a machining groove 14 is formed. In a die machining method in prior art, in a case of carrying out machining to produce a core 12 using a wire electric discharge machine, a residual stock removal 11 is generally provided in a workpiece base material 10 during rough machining and the core 12 is cut off during a post treatment.

Therefore, an operator has to stay on the wire electric discharge machine for the core cutoff machining, and also it takes extra time for machining for the number of cores 12. In the cutoff machining in prior art, there are possibilities of: (a) disconnecting the wire electrode 13 by the core 12 to be cut off which makes contact with the wire electrode 13; (b) damaging both the core 12 and the workpiece base material 10 due to development of concentration of local electric discharge before short circuit of the wire electrode 13 and the workpiece base material 10 via the core 12 to be cut off and drop; and (c) breaking a nozzle, such as fracturing or cracking a lower nozzle with the dropping core, so that they become a burden on the operator.

FIGS. 9A through 9C are diagrams to illustrate problems that occur upon cutting off a core during die machining in prior art.

FIG. 9A illustrates that there is a possibility of disconnecting a wire electrode 26 by a core 20 that is cut off making contact with the wire electrode 26, where the reference numeral 21 denotes an area in which the wire electrode is disconnected by the machining to cut off the core 20. FIG. 9B illustrates that there is a possibility of breaking a nozzle, such as fracturing or cracking a lower nozzle with the dropping core, where the reference numeral 23 denotes an area in which the core breaks a lower nozzle due to the cutoff machining. FIG. 9C illustrates that there is a possibility of damaging both the core and a workpiece base material 24 due to development of concentration of local electric discharge before short circuit of the wire electrode 26 and the workpiece base material 24 via the core to be cut off and drop, where the reference numeral 25 denotes an area in which the core makes contact with the workpiece base material due to the cutoff machining.

With that, in order to prevent movement of a workpiece during machining with a wire electric discharge machine and to prevent drop of a core at the time of finishing the machining, a technique making use of phenomenon that electrode component particles are attached to the workpiece base material is known. Techniques to fix a core and a workpiece base material by depositing attachments in a machining groove of the workpiece are known as follows.

Japanese Patent Application Laid-Open No. 57-96724 discloses a technique that, in wirecut electric discharge machining that produces a core, a workpiece base material and a core are bonded by depositing attachments in a machining groove between the core and the workpiece base material, thereby holding the core with the workpiece base material during the machining.

FIG. 10 is a diagram to illustrate a workpiece base material having a core in a thin rib or pectinate shape machined therein.

Electric discharge machining is carried out in a workpiece base material 31 from a machining start hole 15 along a machining path and attachments 35 containing brass of the wire electrode are attached and deposited along the machining groove formed in the machining path. A core 30 has an area 30a in a thin rib or pectinate shape of the core. The workpiece base material 31 has an area 31a in a thin rib or pectinate shape of the workpiece base material 31. By the attachments 35 attached and deposited along the machining groove, the core 30 is held in the workpiece base material 31.

In addition, Japanese Patent Application Laid-Open No. 62-218024 discloses a technique to prevent drop of a machined object by attaching an electrode component to an arbitrary part of a machining groove, and the attachment of the electrode component occurs at a desired point of the machining groove along a slight distance.

However, in Japanese Patent Application Laid-Open No. 57-96724 above, it is described to hold the core with the workpiece base material by depositing the attachments all around the machining groove from a machining start time to a machining end time. Accordingly, with this technique, it becomes difficult to strike off the core after electric discharge machining because the core and the workpiece base material are firmly bonded by the attachments containing brass of the wire electrode that are deposited all around the machining groove.

Therefore, when trying to strike off a core forcibly, a variety of problems are prone to occur, such as, in a case of a small core, that there is a possibility of damaging a workpiece base material by hitting the workpiece base material by mistake, that there is a possibility of hitting many times because a core does not easily fall, thereby damaging a workpiece base material due to misalignment of the core, and that there is a possibility of hitting many times because a core does not easily fall, thereby disabling later machining due to misalignment of a workpiece base material fixed to a table and, in a case of a core in a shape, such as a thin rib or pectinate shape, that there is a possibility of breaking off the ribs or the pectinate portion.

FIGS. 11A through 11E are diagrams to illustrate a variety of problems that possibly occur upon striking off a core from a workpiece base material after depositing attachments all around a machining groove by the prior art techniques.

As illustrated in FIG. 11A, when the attachments 35 are deposited all around the core 30 (all around the machining groove), it becomes difficult to strike off the core 30. When trying to strike off the core 30, as illustrated in FIG. 11B, there is a possibility of misaligning a position of the core 30 and so damaging the workpiece base material 31 and, as illustrated in FIG. 11C, there is also a possibility of misaligning a position of the workpiece base material 31. Further, as illustrated in FIG. 11D, when using a hammer 37 to strike off the core from the workpiece base material 31, there is also a possibility of damaging the workpiece base material 31 by hitting the workpiece base material 31 by mistake, not the core 30, with the hammer 37. In addition, as illustrated in FIG. 11E, in such a case that the workpiece base material 31 after machining has an area 31a in a thin rib or pectinate shape, there is a possibility of bending the workpiece base material 31.

The technique disclosed in Japanese Patent Application Laid-Open No. 62-218024 described above is to prevent drop of a machined object by attaching an electrode component to an arbitrary part of a machining groove, and the attachment phenomenon occurs at a desired point of the machining groove only along a slight distance. However, this technique is to attach an electrode component in an arbitrary part of the machining groove only along a slight distance, and the electrode component is not always attached by an amount necessary to hold the core with the workpiece base material. For example, there is a possibility that the core falls from the workpiece base material during machining due to a too small number of specified attachment places, while in contrast, there is also a possibility that it becomes difficult to strike off the core from the workpiece base material due to a too large number of specified attachment places.

SUMMARY OF THE INVENTION

With that, in view of the above problems in the prior art techniques, it is an object of the present invention to provide a wire electric discharge machine and an automatic programming device for a wire electric discharge machine to hold a core with a workpiece base material, in an arbitrary machining groove during machining, by attaching brass contained in a wire electrode to the machining groove, and further, to provide a wire electric discharge machine and an automatic programming device for a wire electric discharge machine that can arbitrarily set a place where attachments are deposited and can deposit the attachments only in an amount minimally necessary to fix the core to the workpiece base material.

In order to load a machining program into a wire electric discharge machine after automatically setting a part to attach brass of a wire electrode, a "method A" or a "method B" below are employed. Automatic setting of a place where attachments are attached containing brass derived from a wire electrode to a workpiece base material is carried out as a through c below.

<Method A>
(1) A machining shape program for a machined object (core shape program) is created on a wire electric discharge machine.
(2) An attachment place is automatically obtained from a machining program created in (1) on the wire electric discharge machine to modify the machining program.

<Method B>
(1) A machined object machining shape (core shape) program is created on an automatic programming device.
(2) An attachment place is automatically obtained from a machining program created in (1) on the automatic programming device.
(3) The machining program is modified from the attachment place obtained in (2) on the automatic programming device.
(4) The modified machining program is transferred to the wire electric discharge machine.

<Automatic Setting of Place Where Attachments are Attached to Workpiece Base Material>
a. A position of the center of gravity of a machining shape is calculated from a machining program created once, and a position where attachments are attached such that a core does not tilt is set.
b. An intersection of a straight line and a straight line, an intersection of a straight line and a curved line, or a point at which curvatures in front and behind thereof vary, which form the created machining shape (shape of the core), is calculated (hereinafter, such an intersection or a point is referred to as "a junction"), and a position where attachments are attached is set for each predetermined distance from the calculated junction.
c. A position where attachments are attached is set for each predetermined distance from an end point of an approach block of the machining program.

The calculation of a place where attachments are attached may also be carried out together with the following methods. According to the present invention, an amount of the attachments (length along the machining groove) can be a preset amount (a preset length along the machining groove), or specified arbitrarily by a user, in addition to the position where attachments are attached (attachment position).

1. When the number of junctions on adjacent sides is less than a predetermined value stored in advance in a memory device, they are not considered as positions where attachments (brass of the wire electrode) are to be attached (in order to prevent attachments from being attached to a narrow-shaped portion in a case of a thin rib or pectinate shape).
2. In a case where two or more convex corners or two or more concave corners are continued, attachments are not allowed to adhere to sides sandwiching the corners.
3. An operator is allowed to modify a position where brass of the wire electrode is attached as needed.

In the present invention, in rough machining to produce a core, the core and a workpiece base material are attached and fixed making use of brass of the wire to automatically recognize a junction of sides defining a shape of a machined object, a position of the center of gravity of the machined object, and the like from the machining shape using an automatic programming device and the like and to automatically deposit attachments in a necessary amount in a necessary place. In this regard, it can be expected to reduce a burden on the operator than the prior art techniques and even to reduce man-hours. Since it is possible to deposit attachments in a minimal amount necessary to hold the core with the workpiece base material at an arbitrary position, the problems upon striking off a core that possibly occur in the prior art techniques are also solved. A place where attachments are deposited may also be specified arbitrarily by program codes and the like.

A first mode of the wire electric discharge machine according to the present invention relatively moves a wire electrode containing brass and a workpiece in accordance with a machining program to machine the workpiece by electric discharge produced between the wire electrode and the workpiece. The wire electric discharge machine comprises: a machining shape calculation unit that obtains a machining shape from the machining program; an attachment/deposition region setting unit that sets, from the obtained machining shape, an attachment/deposition region in which machining chips containing brass produced during machining are attached and deposited to the workpiece; and an attachment/deposition unit that attaches and deposits machining chips containing brass produced during machining to the workpiece according to the attachment/deposition region set in the attachment/deposition region setting unit.

The attachment/deposition region setting unit may be configured to calculate a position of a center of gravity of the machining shape obtained from the machining shape calculation unit and to set the attachment/deposition region at intersections of two orthogonal straight lines, each passing through the position of the center of gravity of the machining shape, with the machining shape.

The attachment/deposition region setting unit may be configured to obtain an intersection of a straight line and a straight line, an intersection of a straight line and a curved line, or a point at which curvatures in front and behind thereof vary, from the machining program or the machining shape, and to set the attachment/deposition region at a position on a machining path at a predetermined distance away from at least any one of such an intersection or a point thus obtained.

The wire electric discharge machine may further comprise an attachment region reflection unit that makes the attachment/deposition region set by the attachment/deposition region setting unit reflect in the machining program.

A second mode of the wire electric discharge machine according to the present invention relatively moves a wire electrode containing brass and a workpiece in accordance with a machining program to machine the workpiece by electric discharge produced between the wire electrode and the workpiece. The wire electric discharge machine comprises: an attachment/deposition region setting unit that sets an attachment/deposition region in which machining chips containing brass produced during machining are attached and deposited to the workpiece, for each predetermined distance from an approach block finishing position of the machining program; an attachment/deposition unit that attaches and deposits machining chips containing brass produced during machining to the workpiece according to the attachment/deposition region set in the attachment/deposition region setting unit.

The wire electric discharge machine may further comprise an attachment region reflection unit that makes the attachment/deposition region set by the attachment/deposition region setting unit reflect in the machining program.

An automatic programming device according to the present invention creates a machining program used in a wire electric discharge machine that relatively moves a wire electrode containing brass and a workpiece to machine the workpiece by electric discharge produced between the wire electrode and the workpiece. The automatic programming device comprises: a machining shape input unit that inputs a machining shape; an attachment/deposition region setting unit that sets an attachment/deposition region from the machining shape inputted in the machining shape input unit; and a machining program generation unit that generates the machining program in which the attachment/deposition region set in the attachment/deposition region setting unit is taken into consideration.

The attachment/deposition region setting unit may be configured to calculate a position of a center of gravity of the inputted machining shape and to set the attachment/deposition region at intersections of two orthogonal straight lines, each passing through the position of the center of gravity of the machining shape, with the machining shape.

The attachment/deposition region setting unit may be configured to obtain an intersection of a straight line and a straight line, an intersection of a straight line and a curved line, or a point at which curvatures in front and behind thereof vary, from the input machining shape, and to set the attachment/deposition region at a position on a machining path at a predetermined distance away from at least any one of such an intersection or a point thus obtained.

The attachment/deposition region setting unit may be configured to set the attachment/deposition region for each predetermined distance from an approach block finishing position of the machining shape.

According to the present invention, it becomes possible to provide a wire electric discharge machine and an automatic programming device for a wire electric discharge machine that can arbitrarily set a place where attachments are deposited and can deposit attachments in a minimal amount necessary to fix a core to a workpiece base material.

In addition, in the present invention, attachments can be deposited in a minimal amount necessary to fix a core to a workpiece base material and it is possible to solve the problems described above that possibly occur upon striking off a core. Still in addition, in the present invention, a junction of sides and a position of the center of gravity of a machined object are calculated from a machining shape using an automatic programming device and the like and it is possible to automatically set a position where attachments are deposited, so that there is almost no burden on an operator.

In addition, in the present invention, a place where attachments are deposited can be set automatically, and it is possible to calculate a place where attachments are attached in a minimal amount necessary to hold a core to a workpiece base material using information, such as a position of the center of gravity and a mass of the machined object. The information, such as a position of the center of gravity and a mass of the machined object, can be calculated separately. Therefore, it is possible to avoid the problems of too little or too much attachment of attachments in the prior art techniques described above.

Yet in addition, according to the present invention, a residual stock removal becomes not required in machining to produce a core, so that operation over a long period of time in rough machining is enabled. And also, the problems described above that possibly occur during cutoff machining in prior art can be solved, and it is possible to reduce the time for an operator to be in charge of cutoff machining.

BRIEF DESCRIPTION OF THE DRAWINGS

The objects and features described above and others of the present invention will become obvious from the descriptions in embodiments below with reference to attached drawings. Among the drawings.

DETAILED DESCRIPTION OF THE PREFERRED EMBODIMENTS

Figure 1A:
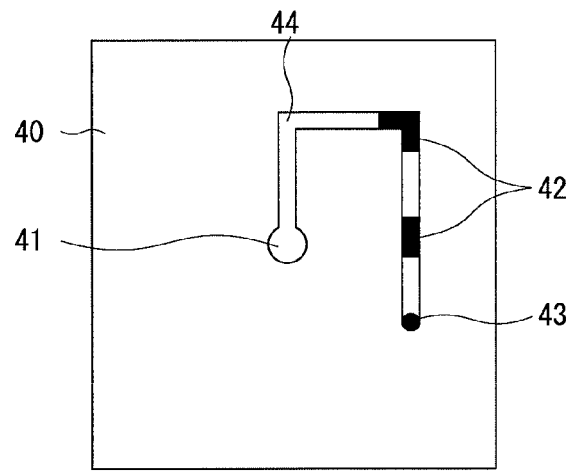
FIGS. 1A through 1C are diagrams to illustrate a first embodiment of a wire electric discharge machine according to the present invention in which a core is held with a workpiece base material.

The present invention is characterized in that, for a machining shape created using a wire electric discharge machine, an automatic programming device for a wire electric discharge machine, and the like, an amount of attachments (machining chips derived from a wire electrode containing brass) minimally necessary to hold a core with a workpiece base material is automatically calculated using a wire electric discharge machine or an automatic programming device. Accordingly, an operator does not have to carry out an operation, such as setting of an arbitrary place where attachments are attached after considering in advance the problems described above that possibly occur upon striking off a core generated in a shape like thin ribs or pectens. Since a minimally necessary amount of attachments can be set with a wire electric discharge machine or an automatic programming device, the bonding strength of a core and a workpiece base material can be optimized and the core can be stroke off easily compared with the prior art techniques in which attachments are deposited all around the machining groove. Further, the core cutoff machining, which used to be necessary conventionally, becomes not required, thereby enabling unattended machining over a long period of time of the wire electric discharge machine.

Here, descriptions are given to a schematic configuration of the wire electric discharge machine. The wire electric discharge machine is equipped with a controller and a machining machine, where the controller controls the entire wire electric discharge machine. The controller is equipped with a processor (CPU), an input device, and a memory. The processor (CPU) controls the entire wire electric discharge machine by system software stored in the memory. The input device is configured with a keyboard and the like, and an operator can input various types of data, such as machining conditions, using the input device. In addition, the processor (CPU) outputs a movement command corresponding to the machining conditions to respective axes control circuit in accordance with a machining program stored in a RAM of the memory, and the respective axes control circuit outputs a driving command to drive a servo motor of each axis to a servo amplifier of each axis.

The wire electric discharge machine is equipped with a power source to supply electric discharge energy to a machining gap between a wire electrode and a workpiece. The wire electrode is stretched by a predetermined tension between a set of wire guides (for example, an upper wire guide and a lower wire guide) disposed at a predetermined interval. In the memory of the wire electric discharge machine, software to execute the present invention is stored.

The wire electric discharge machine according to the present invention is equipped with an attachment/deposition unit to attach and also deposit machining chips derived from the wire electrode containing brass to the workpiece base material by applying a machining current with a long pulse width for machining between the workpiece base material and the wire electrode or by controlling the specific resistance of a machining fluid. Since such an attachment/deposition unit is already known as disclosed in Japanese Patent Application Laid-Open No. 57-96724 and Japanese Patent Application Laid-Open No. 62-218024 described above, the descriptions are omitted. In addition, a known one can be used for the automatic programming device itself for a wire electric discharge machine to perform the present invention. An automatic programming device for wire electric discharge machining is equipped with an input device to input a machining program, and has a function to detect an attachment/deposition region, which is a place where attachments derived from the wire electrode are attached to and deposited on the workpiece base material, by analyzing the machining program.

Figure 1B:
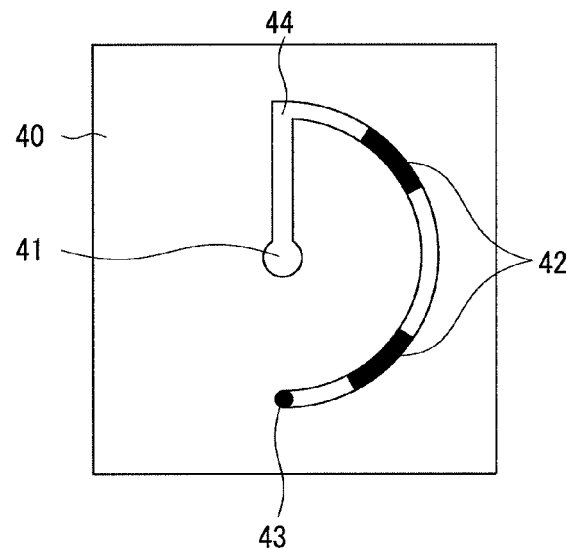
Figure 1C:
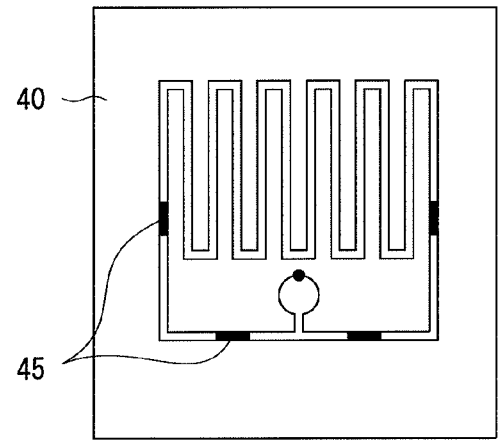

FIGS. 1A through 1C are diagrams to illustrate a first embodiment of a wire electric discharge machine according to the present invention in which a core is held with a workpiece base material.

With a wire electric discharge machine, electric discharge machining is carried out by relatively moving a wire electrode 43 and a workpiece base material 40 from a machining start hole 41. Over a predetermined range of a machining groove 44 in the workpiece base material 40, attachments containing brass derived from the wire electrode 43 are attached and deposited to the machining groove 44 formed in the workpiece base material 40 by the attachment/deposition unit, thereby forming a bridge.

The place where attachments are attached and deposited (attachment/deposition position) may also be set automatically utilizing a predetermined region including at least one of an intersection of a straight line and a straight line, an intersection of a straight line and a curved line, or a point at which curvatures in front and behind thereof vary (that is, a junction of a first curved line with a first curvature and a second curved line with a second curvature), defining a machining path with the wire electric discharge machine. Alternatively, a part including at least one of the intersection of a straight line and a straight line, the intersection of a straight line and a curved line, or the at which curvatures in front and behind thereof vary, defining a machining path obtained upon creating a machining shape with an automatic programming device and the like, may also be automatically set as the attachment place.

In the wire electric discharge machine and the automatic programming device for a wire electric discharge machine according to the present invention, the attachment/deposition region may also be set so that machining chips containing brass, produced during machining, are attached and deposited to the workpiece base material, for example, for each predetermined distance from a finishing position of an approach block of the machining program. Alternatively, the position where attachments are deposited may also be specified directly from an operation screen or a program.

In FIGS. 1A and 1B, the reference numeral 42 denotes places where attachments containing brass of the wire electrode 43 are deposited at arbitrary positions in the machining path. In a case where it is not sufficient to hold the core by means of only the attachments that are attached in a predetermined region (for example, a case where an amount of such attachment to hold a core is insufficient because the core is very large, a case where it becomes difficult to strike off a core because all around the core shape is filled with attachments when attaching such attachments to a predetermined region since the core is very small, and a case where the workpiece base material is damaged upon striking off a core when attachments are attached to a predetermined region of the core in a shape like a thin rib or a pectinate shape), the mass of the core may also be increased, decreased, or the position where attachment are to be deposited may also be modified with respect to the center of gravity of the core.

In conventional machining of a core in a thin rib or pectinate shape as illustrated in FIG. 1C, attachments are deposited on all sides (straight lines or curved lines defining the machining shape) in the pectinate area, as a result, it becomes difficult to strike off the core. Therefore, attachment of attachments is not carried out to such pectinate area, and control to make attachments to be attached and deposited to the attachment/deposition position set on an outer periphery of the machining shape, as denoted by the reference numeral 45 in FIG. 1C, is carried out. Here, the "attachment/deposition" means that attachments are attached to the workpiece base material and then deposited.

Figure 2A:
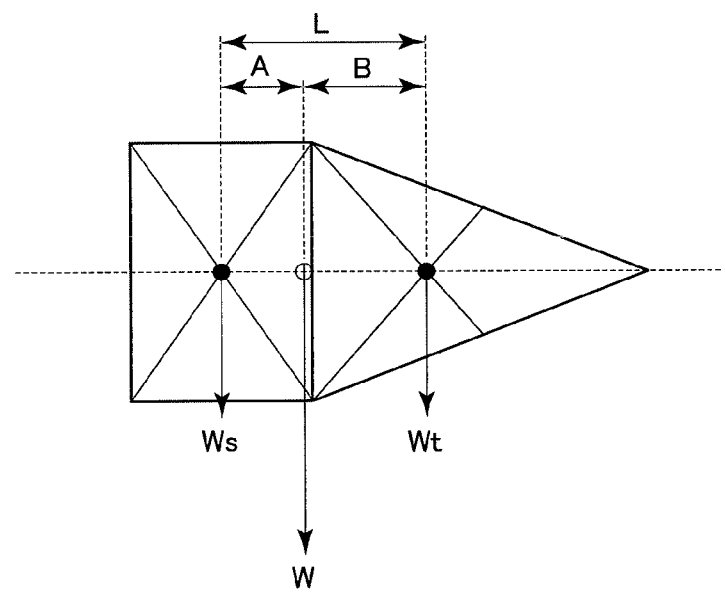
FIGS. 2A and 2B are diagrams to illustrate a second embodiment of a wire electric discharge machine according to the present invention in which a position of the center of gravity of the core, which is information necessary for automatic setting of a place where attachments are attached, is calculated.
Figure 2B:
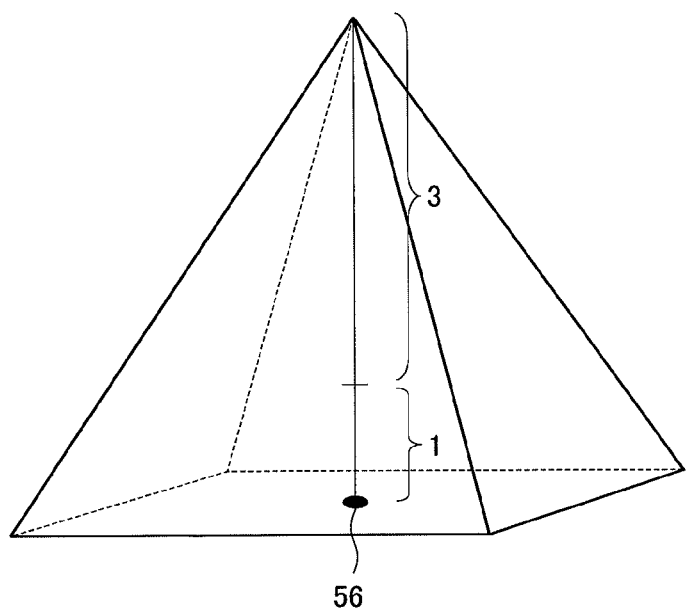

FIGS. 2A and 2B are diagrams to illustrate a second embodiment of a wire electric discharge machine according to the present invention in which a position of the center of gravity of the core, which is information necessary for automatic setting of a place where attachments are attached, is calculated.

An example of a core illustrated in FIG. 2A has a shape (composite core shape) formed by combining a quadrilateral shaped portion on the left side and a triangular shaped portion on the right side. The quadrilateral shaped portion has a weight of Ws and a position of the center of gravity thereof is represented by "●" in the quadrilateral shape, and the triangular shaped portion has a weight of Wt and a position of the center of gravity thereof is represented by "●" in the triangular shape, as shown in FIG. 2A. A distance between the position of the center of gravity of the quadrilateral shaped portion and the position of the center of gravity of the triangular shaped portion is L. The composite core formed by combining the quadrilateral shaped portion and the triangular shaped portion has a weight of W(=Ws+Wt) and the center of gravity thereof is represented by "○" in FIG. 2A. Further, a distance between the position of the center of gravity of the composite core and the position of the center of gravity of the quadrilateral shaped portion is A, and a distance between the position of the center of gravity of the composite core and the position of the center of gravity of the triangular shaped portion is B.

In a case of a core having a quadrangular pyramid shape as illustrated in FIG. 2B, a position of the center of gravity of the base of the quadrangular pyramid is a position denoted by the reference numeral 56.

<Method of Calculating Position of Center of Gravity>

A position of the center of gravity of a planar shape or a solid shape may be calculated as follows.

(Case of Planar Shape)

If a planar shape is triangular, a point where the three medians cross one another is the center of gravity, and if it is a parallelogram, an intersection of the diagonals becomes the center of gravity. If the planar shape is a trapezoid, an intersection of a straight line linking the center of gravity of the triangles divided into two and a straight line linking a midpoint of an upper bottom and a midpoint of a lower bottom becomes the center of gravity. If it is a shape formed by integrating a plurality of shape portions as shown in FIG. 2A, a position of the center of gravity is calculated for each shape portion and a position of the center of gravity of the shape of integrating these respective shape portions can be obtained by the following equation (1).

In FIG. 2A, from the balance of the moment of force, $$Ws \times A = Wt \times B,$$

$$L = A + B.$$

From the two equations above, $$Ws \times A = Wt \times (L-A).$$

From the equation above, $$(Ws+Wt) \times A = Wt \times L.$$

Therefore, $$A = Wt \times L / (Ws + Wt) \qquad (1).$$

Similarly, $$B = Ws \times L / (Ws + Wt) \qquad (2).$$

As just described, the position of the center of gravity of the composite shape illustrated in FIG. 2A can be obtained from the equation (1) or (2).

(Case of Solid Shape)

The center of gravity is located at, if the solid shape is a cube, a half distance of a segment linking respective positions of the center of gravity of two facing planes, and if it is a pyramid, a quarter distance of a segment linking a position 56 of the center of gravity of the bottom and the vertex facing the bottom (that is, a position dividing the segment into 1:3) as illustrated in FIG. 2B.

(Method of Calculating Mass)

Since there is not always necessity to precisely calculate the mass of the core, the mass may also be calculated as the equation below.

(Mass)=(Area of a planar shape)×(Plate thickness)× (Specific gravity of a machining material)

or (Mass)=(Volume)×(Specific gravity of a machining material).

FIGS. 3A through 3G are diagrams to illustrate a third embodiment of the present invention in which a position where attachments are deposited is set for each predetermined distance from the position of the center of gravity of a graphic, for each predetermined distance from a predetermined position including an intersection of a straight line and a straight line, an intersection of a straight line and a curved line, or a point at which curvatures in front and behind thereof vary (as described above, the intersection or the point is referred to as a junction) defining a machining path, or for each predetermined distance from an approach end point.

Figure 3A:
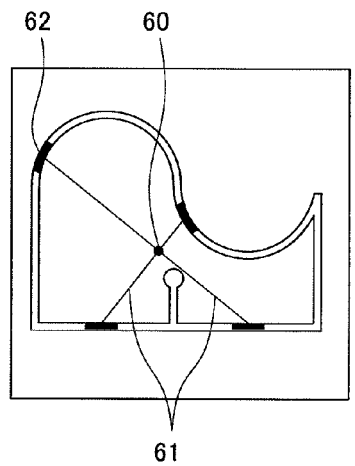
FIGS. 3A through 3G are diagrams to illustrate a third embodiment of a wire electric discharge machine according to the present invention in which a position where attachments are deposited is set for each predetermined distance from a predetermined position including an intersection of a straight line and a straight line, an intersection of a straight line and a curved line, or a point of varying curvatures defining a position of the center of gravity and a machining path of a figure or for each predetermined distance from an approach end point.
Figure 3B:
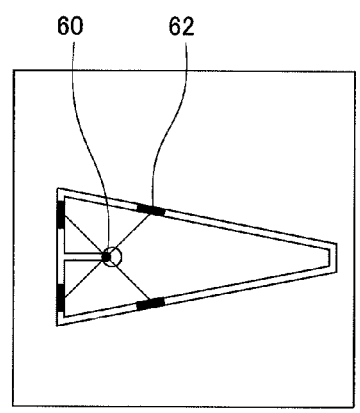
Figure 3C:
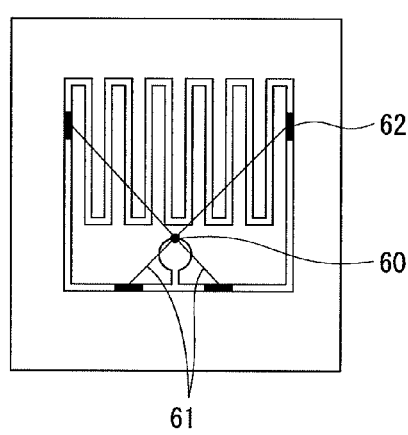

In case of setting a place where attachments are attached based on the position of the center of gravity of a planar figure, as illustrated in FIGS. 3A through 3C, attachment attaching places 62 are set on intersections of two straight lines 61 each passing through, and intersecting at a right angle, at a position 60 of the center of gravity with an outer periphery of the shape or in a predetermined region including the intersections. This enables to stably fix the core because the attachment attaching places face one another across the center of gravity.

The wire electric discharge machine recognizes an outer shape of a workpiece to be machined by reading and analyzing blocks of the machining program. The position of the center of gravity of the machining shape is calculated as shown in the examples above. Then, intersections of the two orthogonal straight lines, each passing through the position of the center of gravity, with the outer shape of the workpiece are obtained. Directions of the two orthogonal straight lines are selected so as to, for example, intersect at 45 degrees with each driving axis relatively moving the workpiece to the wire electrode, or to approximately evenly distribute the positions of the intersections of the outer shape of the workpiece with the two straight lines around the position of the center of gravity.

In an automatic programming device for a wire electric discharge machine, a shape of a workpiece to be machined is created to calculate a position of the center of gravity of the created workpiece shape. The intersections of the two orthogonal straight lines with the outer shape of the workpiece are obtained in a manner similar to the above case where a wire electric discharge machine is used.

An amount of attachments to be attached (attachment distance) may be set in advance as a predetermined value according to the mass of the outer shape of the workpiece or may be changeable to an arbitrary value.

Figure 3D:
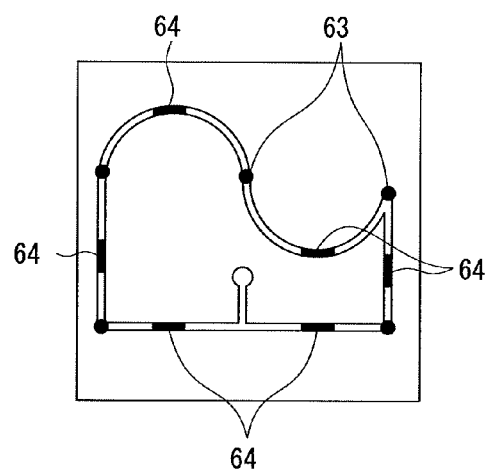
Figure 3E:
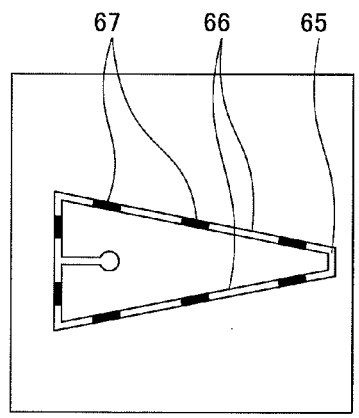
Figure 3F:
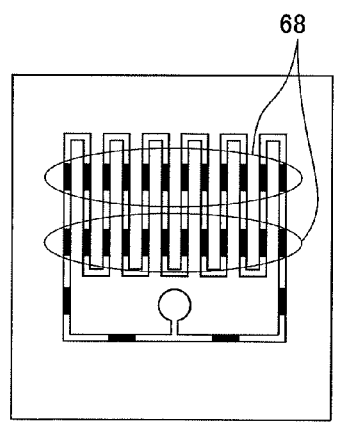

In a case of automatically setting a position where attachments are deposited for each predetermined distance from a predetermined position including the junction or in a case of automatically setting a position where attachments are deposited for each predetermined distance from the approach end point, these attachment positions are as illustrated in FIGS. 3D through 3F.

In a case of automatically setting a position where attachments are deposited for each predetermined distance from a predetermined position including the junction described above, for machining of a shape as shown in FIG. 3D, attachments are attached and deposited at a position of the reference numeral 64. The reference numeral 63 in FIG. 3D is a position (a junction) where the curvatures in front and behind thereof vary. Such a predetermined position including the junction includes, in addition to a junction, a finishing position where processing of an approach block in the machining program finishes, for example.

In a case of machining a shape as shown in FIG. 3E, attachments may be attached and deposited to a part on a shorter side 65 or may be attached and deposited to a plurality of parts on a longer side 66. In a case of depositing attachments on the shorter side 65, there are problems described above that possibly occur upon striking off a core, so that attachment positions that are automatically set may be modified (attachment places may be decreased or increased). Alternatively, as the example of a shape illustrated in FIG. 3E, in a case where the position of the center of gravity is not located near the central part of the core so that the weight of the core does not act evenly on the place where attachments are deposited, it is considered that the core is tilted and the workpiece base material is damaged. Therefore, for preventing the core from tilting by its own weight, the places where attachments are deposited may be increased or decreased based on the calculated position of the center of gravity, as illustrated with reference numeral 67 in FIG. 3E.

Figure 3G:
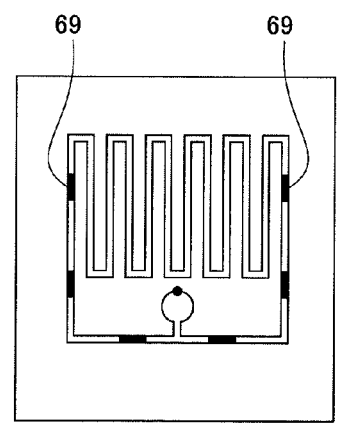

Alternatively, in a case of machining a complex shape as shown in FIG. 3F, when automatically setting a position where attachments are deposited for each predetermined distance from a predetermined region including the junction or when automatically setting a position where attachments are deposited for each predetermined distance from an approach end point, attachments 68 are deposited as illustrated in FIG. 3F, and as a result, there is a possibility of damaging the workpiece base material upon striking off a core (that is to say, if places where attachments are attached are set according to the distance along the machining groove, the density of attachment places turns out to be large and, as a result, an excessive force is applied upon when taking out a machined object, and thus the machined object itself is distorted or, in some cases, broken off to make it difficult to drop the core). Therefore, as illustrated in FIG. 3G, parts where attachments 69 are to be deposited may be set on an outer periphery of the machining shape, thereby avoiding depositing of attachments in intricate complex parts of the shape. For example, if a punch shape/die shape is determined from an offset direction of a wire electrode and two or more consecutive concave corners/convex corners appear, then a requirement not allowing attachments to be attached on sides sandwiching two or more continuous concave corners/convex corners is set, and positions where attachments are to be attached are automatically set as illustrated in FIG. 3G, even in a case of a machining shape as shown in FIG. 3F. As illustrated in FIGS. 3D, 3E, and 3G, even when positions where attachments are to be attached were set automatically, such attachment positions may also be manually modified (or number of attachment positions may be manually increased or decreased).

To make a place where attachments are attached and deposited reflect in a machining program (as a function of an "attachment/deposition region reflection unit" equipped in a wire electric discharge machine), the following setting may be made using M code or the like. For example, if attachments are attached to a side having a length of 10 mm, the side to which the attachments are attached has an M code and an attachment distance P as follows (in the following example, X10 . denotes 1.5 cm of the attachment distance, and X30 . denotes 2 cm of the attachment distance). The attachment positions are basically supposed to be automatically obtained positions (refer to reference numeral 62 in FIGS. 3A through 3C and reference numeral 64 in FIG. 3D) and another code is prepared to increase or decrease the attachment amount. For example, the number of attachment positions are increased by adding M101 and decreased by adding M102 in the program block. In such a manner, the number of positions where attachments are attached and deposited can be increased or decreased by adding codes to the machining program by an operator.

Program Example

```
%
G92 X0 Y0G
91 G01
X10. M100 P1.5
    :
X30. M101 P2.0 ←M100 is rewritten to M101 to increase the
attachment places.
    :
M30
%
```

Figure 4:
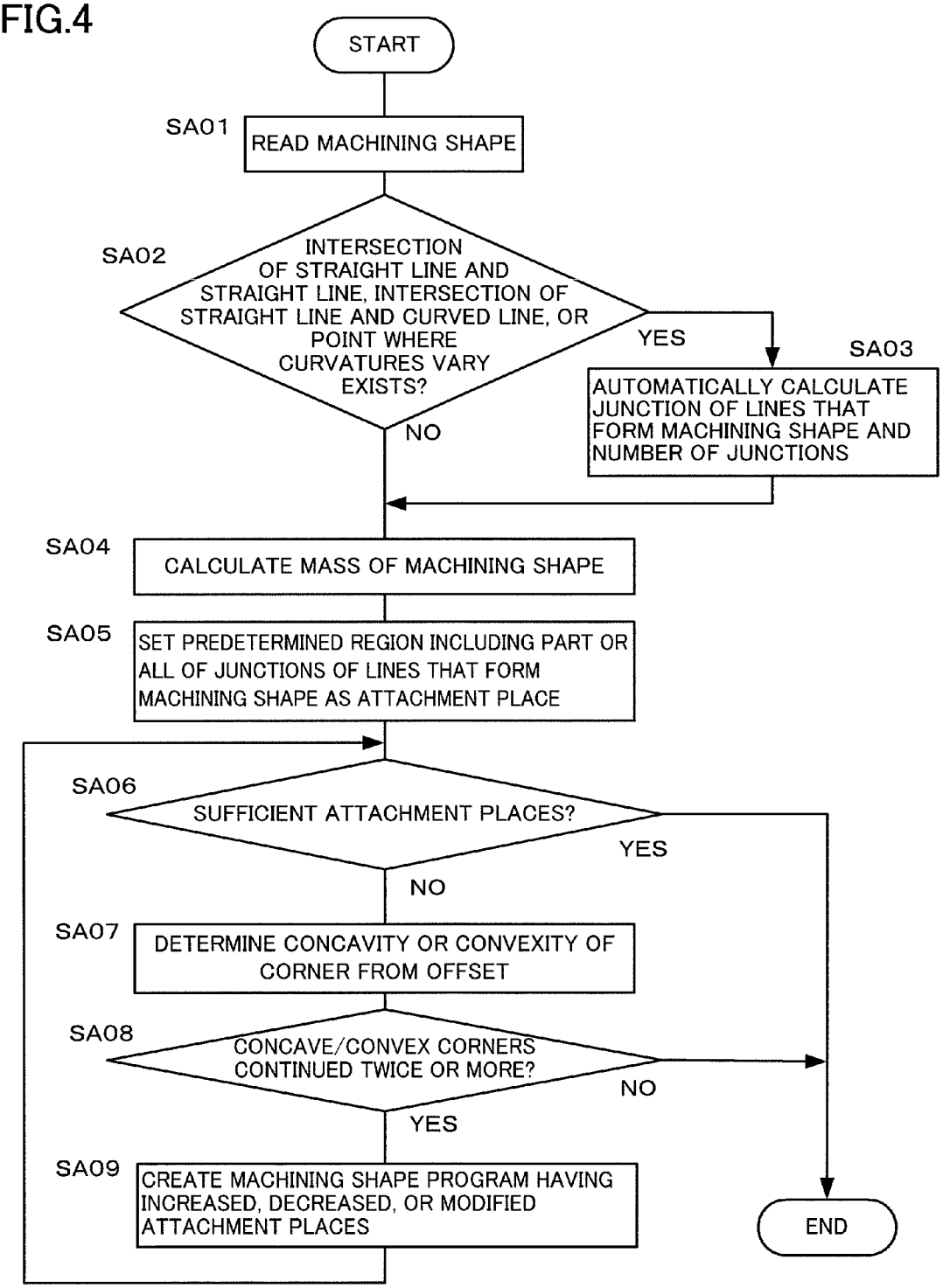
FIG. 4 is a flowchart showing a fourth embodiment of a wire electric discharge machine according to the present invention in which, after a machining program is created on a wire electric discharge machine, a position where attachments are deposited is automatically set to modify the machining program.
Figure 5:
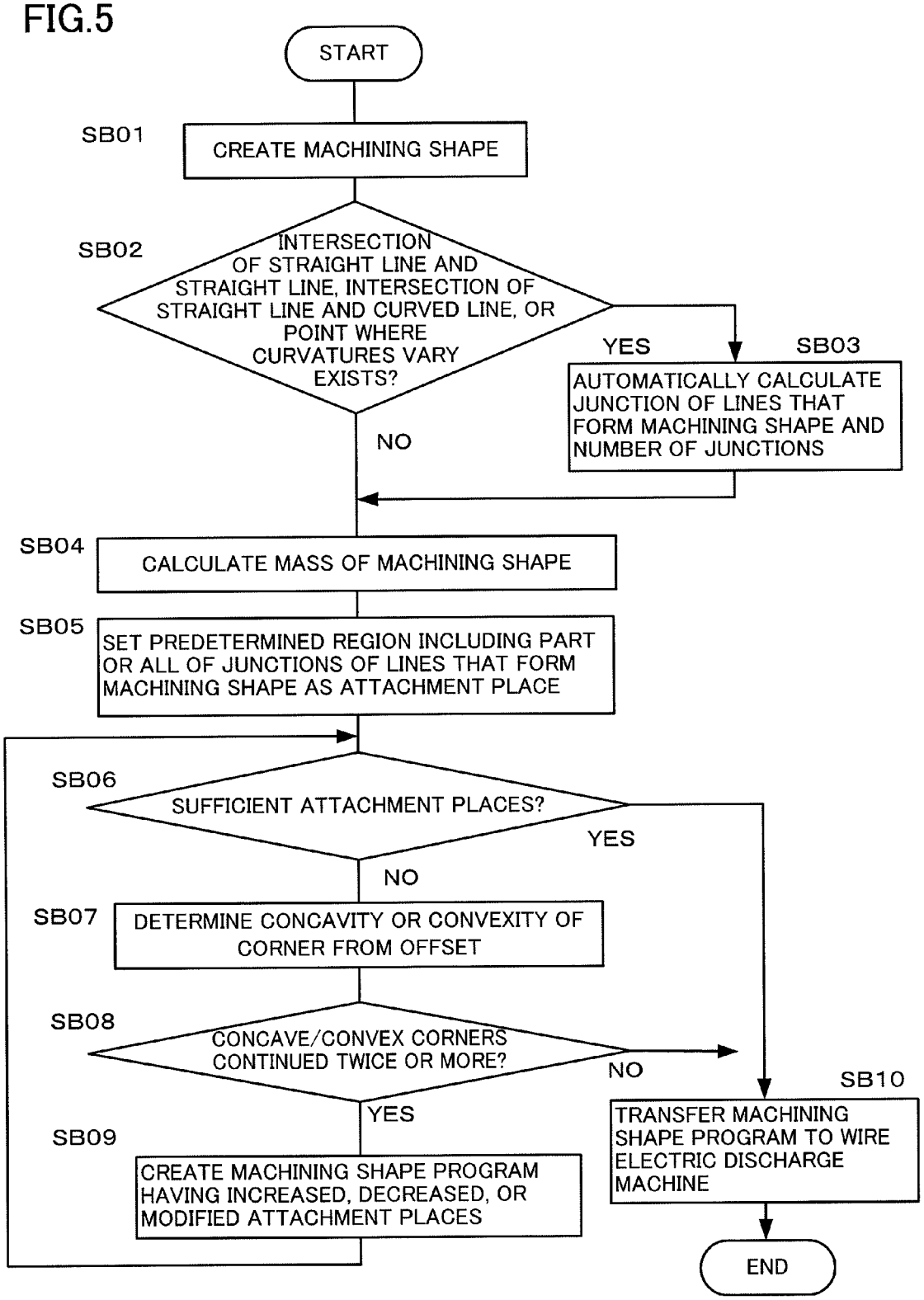
FIG. 5 is a flowchart showing the fourth embodiment of a wire electric discharge machine according to the present invention in which, after a machining shape is programmed on an automatic programming device and further a position where attachments are deposited is automatically set from the machining shape, the machining program is modified and transferred to a wire electric discharge machine.
Figure 6:
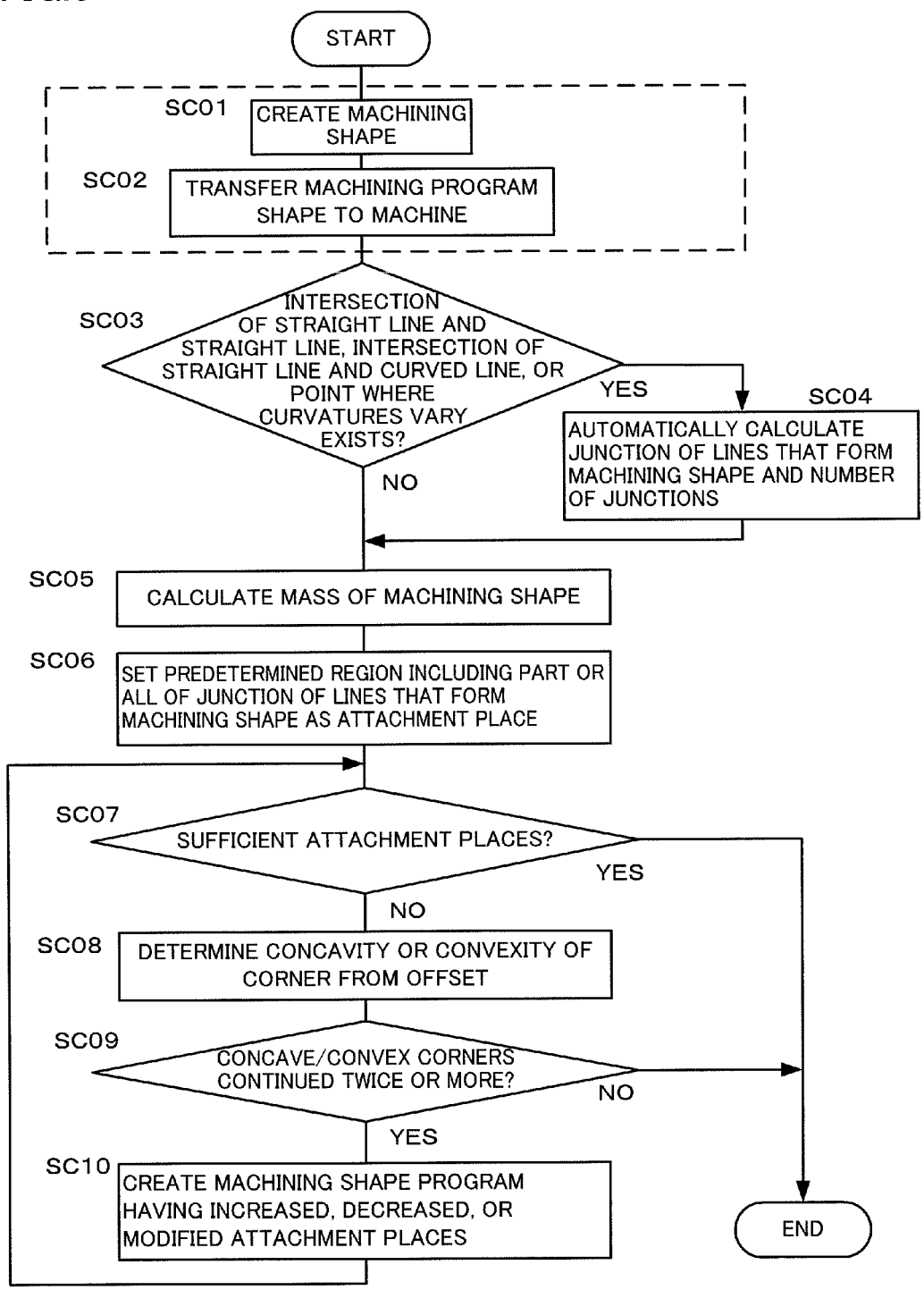
FIG. 6 is a flowchart showing the fourth embodiment of a wire electric discharge machine according to the present invention in which the machining program created on the automatic programming device is transferred to a wire electric discharge machine and a position where attachments are deposited is set on a wire electric discharge machine, and further a machining program automatically setting the deposition position is created again on the wire electric discharge machine.

FIGS. 4 through 6 are charts to illustrate a fourth embodiment of a wire electric discharge machine according to the present invention in which a position where attachments are attached for holding a core with a workpiece base material is set automatically.

Firstly, a machining shape is created using a wire electric discharge machine, an automatic programming device, and the like. For a machining shape created by using a wire electric discharge machine or an automatic programming device, a junction of sides that form the created shape (any of an intersection of a straight line and a straight line, an intersection of a straight line and a curved line, or a point where curvatures vary) is found and the found junction is automatically set as a position where attachments are deposited over a range set in advance by means of an operation screen or the like. When calculating a mass of the machining shape, a position of the center of gravity of the machining shape may be calculated for determining the range over which the attachments are attached and deposited. Even in a case where the shapes to be machined are the same, places where attachments are deposited may be increased or decreased according to the mass of the machining shape. For example, in a case of a square shape having dimensions of 10 mm×10 mm, the number of places where attachments are deposited may be four, whereas in a case of 100 mm×100 mm, the number of places where attachments are deposited may be eight or so.

The fourth embodiment of a wire electric discharge machine according to the present invention, in which, after a machining program is created on a wire electric discharge machine, a position where attachments are deposited is automatically set and the machining program is modified, is described using a flowchart in FIG. 4. Descriptions are given below in accordance with each step.

[Step SA01] A machining shape is read. That is, a block of a machining program is read and analyzed to recognize a shape to be machined.

[Step SA02] Whether or not there is an intersection of a straight line and a straight line, whether or not there is an intersection of a straight line and a curved line, or whether or not there is a point at which curvatures in front and behind thereof vary is determined, and if there is at least any of them (such a point or an intersection) (YES), the process proceeds to step SA03, but if there is none of them (NO), the process proceeds to step SA04.

[Step SA03] A junction of lines that form the machining shape and the number of such junctions are automatically calculated.

[Step SA04] A mass of the machining shape is calculated.

[Step SA05] A predetermined region including part of or all of junctions of lines that form a machining shape is set as attachment places.

[Step SA06] Whether or not there are sufficient attachment places is determined, and if they are sufficient (YES), this process is terminated, but if they are not sufficient (NO), the process proceeds to step SA07. Here, whether or not there are sufficient attachment places can be determined based on, for example, whether or not the mass of the workpiece calculated in step SA04 can be supported at the attachment places calculated in step SA05, or whether or not the rotational moment is produced around the center of gravity of the machining shape.

[Step SA07] Whether the machining corner is concave or convex is determined from an offset direction of the wire electrode upon electric discharge machining.

[Step SA08] Whether or not convex corners or concave corners are continued twice or more (whether or not either of two or more consecutive convex corners or two or more consecutive concave corners appear) is determined, and if they are continued (YES), the process proceeds to step SA09, but if they are not (NO), this process is terminated.

[Step SA09] A machining shape program in which places where attachments are attached are increased, decreased or modified is created, and the process returns to step SA06.

If an amount of attachments (length of attachments along the machining groove) to be attached in one attachment place is set in advance, such an attachment place may be set as an attachment position in steps SA05 and SA09.

The fourth embodiment of a wire electric discharge machine according to the present invention, in which, after a machining shape is programmed on an automatic programming device and then a position where attachments are deposited is automatically set from the machining shape, the machining program is modified and transferred to the wire electric discharge machine, is described using the flowchart in FIG. 5. Descriptions are given below in accordance with each step.

[Step SB01] A machining shape is created.

[Step SB02] Whether or not there is an intersection of a straight line and a straight line, whether or not there is an intersection of a straight line and a curved line, or whether or not there is a point at which curvatures in front and behind thereof vary is determined, and if there is at least any of them (such a point or an intersection) (YES), the process proceeds to step SB03, but if there is none of them (NO), the process proceeds to step SB04.

[Step SB03] A junction of lines that form the machining shape and the number of junctions are automatically calculated.

[Step SB04] A mass of the machining shape is calculated.

[Step SB05] A predetermined region including part or all of junctions of lines that form a machining shape is set as attachment places.

[Step SB06] Whether or not there are sufficient attachment places is determined, and if they are sufficient (YES), this process is terminated, but if they are not sufficient (NO), the process proceeds to step SB07.

[Step SB07] Whether the machining corner is concave or convex is determined from an offset direction of the wire electrode upon electric discharge machining.

[Step SB08] Whether or not convex corners or concave corners are continued twice or more (whether or not either of two or more consecutive convex corners or two or more consecutive concave corners appear) is determined, and if they are continued (YES), the process proceeds to step SB09, but if they are not (NO), the process proceeds to step SB10.

[Step SB09] A machining shape program in which places where attachments are attached are increased, decreased or modified is created, and the process returns to step SB06.

[Step SB10] The machining shape program is transferred to a wire electric discharge machine, and this process is terminated.

The fourth embodiment of a wire electric discharge machine according to the present invention, in which the machining program created on the automatic programming device is transferred to a wire electric discharge machine and a position where attachments are deposited is set on the wire electric discharge machine, is described using the flowchart in FIG. 6. In this embodiment, a machining program which automatically set the position where attachments are deposited is further created again on the wire electric discharge machine. Steps SC01 and SC02 surrounded by broken lines in FIG. 6 are executed by the automatic programming device, and step SC03 and later are executed by the wire electric discharge machine. Descriptions are given below in accordance with each step.

[Step SC01] A machining shape is created.

[Step SC02] A machining shape program is transferred to a wire electric discharge machine.

[Step SC03] Whether or not there is an intersection of a straight line and a straight line, whether or not there is an intersection of a straight line and a curved line, or whether or not there is a point at which curvatures in front and behind thereof vary is determined, and if there is at least any of them (such a point or an intersection) (YES), the process proceeds to step SC04, but if there is none of them (NO), the process proceeds to step SA05.

[Step SC04] A junction of lines that form the machining shape and the number of junctions are automatically calculated.

[Step SC05] A mass of the machining shape is calculated.

[Step SC06] A predetermined region including part or all of junctions of lines that form a machining shape is set as attachment places.

[Step SC07] Whether or not there are sufficient attachment places is determined, and if they are sufficient (YES), this process is terminated, but if they are not sufficient (NO), the process proceeds to step SC08.

[Step SC08] Whether the machining corner is concave or convex is determined from an offset direction of the wire electrode upon electric discharge machining.

[Step SC09] Whether or not convex corners or concave corners are continued twice or more (whether or not either of two or more consecutive convex corners or two or more consecutive concave corners appear) is determined, and if they are continued (YES), the process proceeds to step SA10, but if they are not (NO), this process is terminated.

[Step SC10] A machining shape program in which places where attachments are attached are increased, decreased or modified is created, and the process returns to step SC07.

Figure 7:
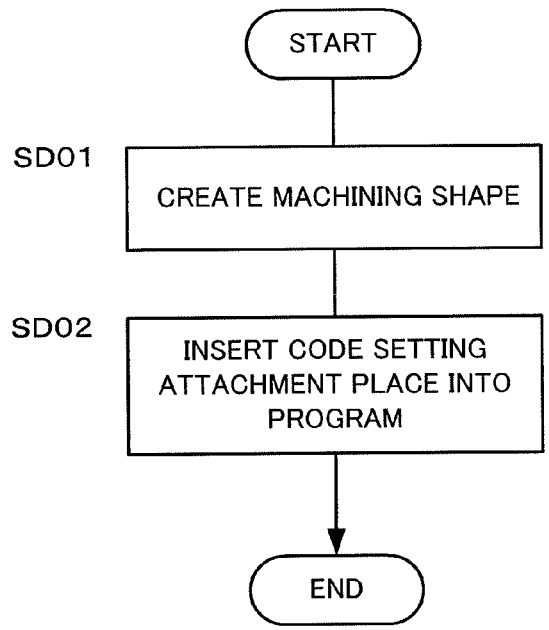
FIG. 7 is a flowchart showing a fifth embodiment of a wire electric discharge machine according to the present invention in which a position where attachments that hold a core with a workpiece base material are deposited is set manually.
Figure 8:
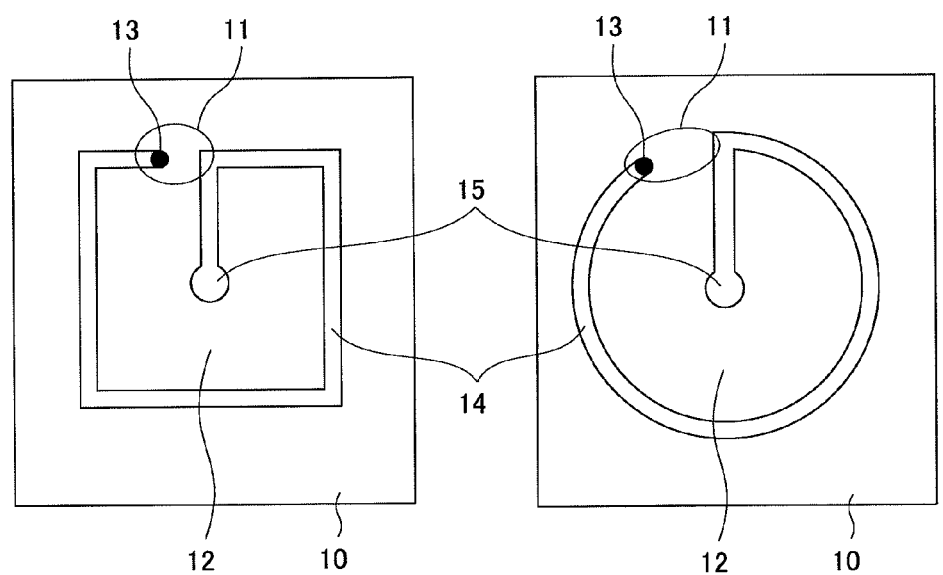
FIG. 8 is a diagram to illustrate a machining method of prior art in which a workpiece base material is provided with a residual stock removal.
Figure 9A:
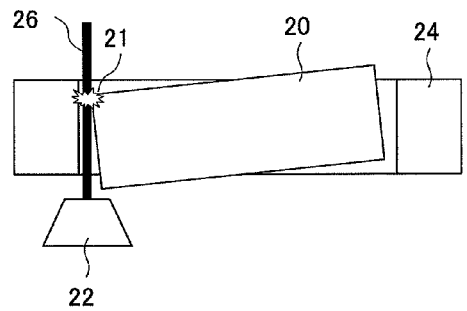
FIGS. 9A through 9C are diagrams to illustrate problems that occur upon cutting off a core during die machining according to a prior art technique.
Figure 9B:
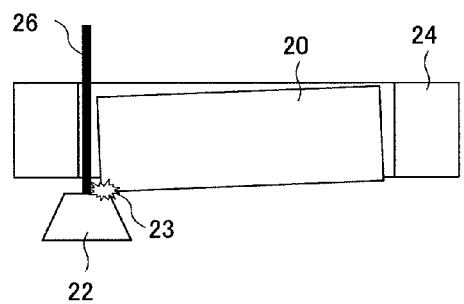
Figure 9C:
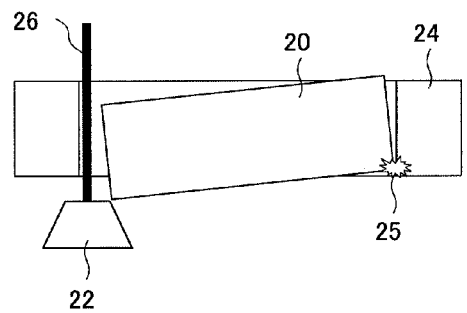
Figure 10:
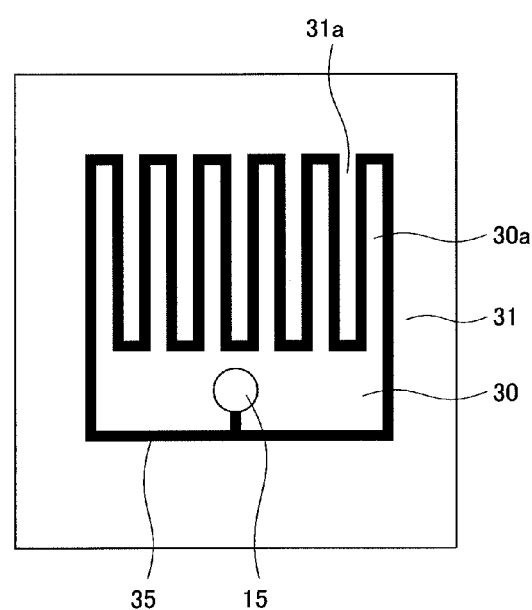
FIG. 10 is a diagram to illustrate a workpiece base material having a core machined in a thin rib or pectinate shape.
Figure 11A:
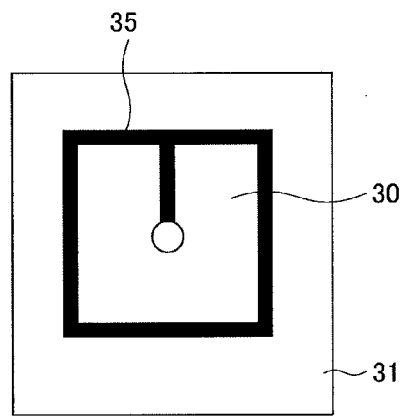
FIGS. 11A through 11E are diagrams to illustrate a variety of problems that possibly occur upon striking off a core from a workpiece base material after depositing attachments all around the machining groove in a prior art technique.
Figure 11B:
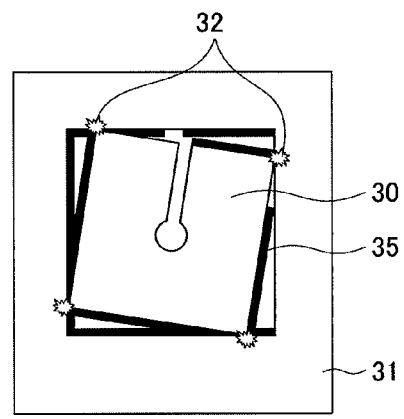
Figure 11C:
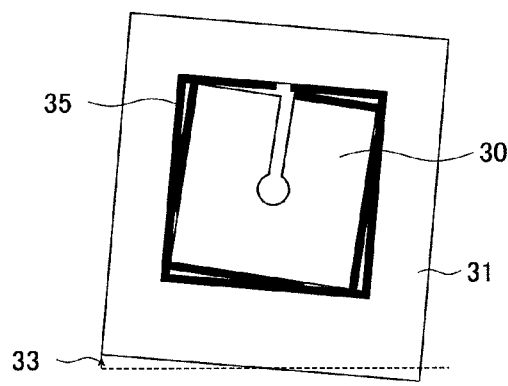
Figure 11D:
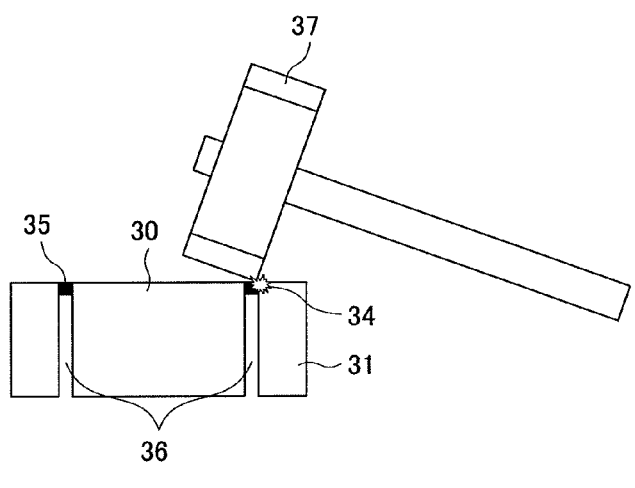
Figure 11E:
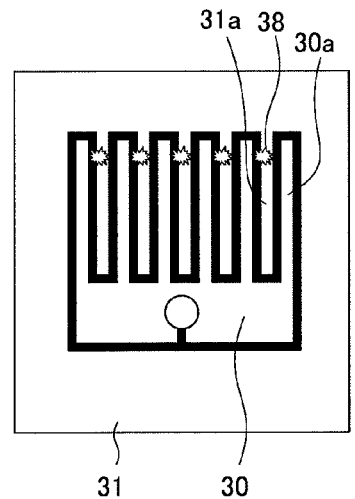

A fifth embodiment of a wire electric discharge machine according to the present invention, in which a position where attachments are deposited for holding a core with a workpiece base material is manually set, is described using a flowchart in FIG. 7.

[Step SD01] A machining shape is created with a program.

[Step SD02] A code for setting places (attachment places) where attachments are deposited is directly inserted into the program, and this process is terminated.

According to the present invention, as described above, in machining in which a core is produced, places where machining chips, containing brass derived from a wire electrode attached to a workpiece base material, are to be deposited can be set automatically, and places where brass attachments of the wire electrode are to be deposited can be manually set using a program code. As a result, by depositing brass attachment of the wire electrode to parts of the side of the core at arbitrary places of the machining groove, a core can be held to the workpiece base material so that the core may be taken out easily. Further, the core can be easily struck off without damaging the workpiece base material, regardless of machining shape. There is a less risk of misaligning a position of the workpiece base material upon striking off the core, and unattended machining over a long period of time is enabled because the core is held with the workpiece base material all the time during rough machining, which reduces a burden on an operator and cutoff machining by an operator is rendered unnecessary so that man-hours for machining can be reduced. As the cutoff machining is rendered unnecessary, disadvantages that possibly occur in conventional cutoff machining (a wire electrode tends to be sandwiched between a core and a workpiece base material and disconnected when the core is fell out; the core and the workpiece base material tend to be short circuited with the result that an abnormal electric discharge is locally developed to damage the workpiece base material; and a nozzle tends to be broken when the core falls out) can be resolved.

The invention claimed is:

1. A wire electric discharge machine which relatively moves a wire electrode containing brass and a workpiece in accordance with a machining program to machine the workpiece by electric discharge produced between the wire electrode and the workpiece, the wire electric discharge machine configured to:
   obtain a machining shape from the machining program;
   calculate a position of a center of gravity of the machining shape and set an attachment/deposition region in which machining chips containing brass produced during machining are attached and deposited to the workpiece at intersections of two orthogonal straight lines, each passing through the position of the center of gravity of the machining shape, with the machining shape; and
   attach and deposit machining chips containing brass produced during machining to the workpiece according to the set attachment/deposition region.

2. The wire electric discharge machine according to claim 1, wherein the wire electric discharge machine is configured to create a new machining program by adding the set attachment/deposition region to the machining program, or by substituting said set attachment/deposition region for a corresponding portion of the machining program.

3. A wire electric discharge machine which relatively moves a wire electrode containing brass and a workpiece in accordance with a machining program to machine the workpiece by electric discharge produced between the wire electrode and the workpiece, the wire electric discharge machine configured to:
   obtain a machining shape from the machining program;
   obtain an intersection of a straight line and a straight line, an intersection of a straight line and a curved line, or a point at which curvatures in front and behind thereof vary, from the machining program or the machining shape, and to set an attachment/deposition region in which machining chips containing brass produced during machining are attached and deposited to the workpiece at a position on a machining path at a predetermined distance away from at least any one of such an intersection or a point thus obtained.

4. The wire electric discharge machine according to claim 3, wherein the wire electric discharge machine is configured to create a new machining program by adding the set attachment/deposition region to the machining program, or by substituting said set attachment/deposition region for a corresponding portion of the machining program.

5. An automatic programming device which creates a machining program used in a wire electric discharge machine that relatively moves a wire electrode containing brass and a workpiece to machine the workpiece by electric discharge produced between the wire electrode and the workpiece, the automatic programming device configured to:

input a machining shape;

calculate a position of a center of gravity of the inputted machining shape and to set an attachment/deposition region in which machining chips containing brass produced during machining are attached and deposited to the workpiece at intersections of two orthogonal straight lines, each passing through the position of the center of gravity of the machining shape, with the machining shape; and generate the machining program in which the set attachment/deposition region is taken into consideration.

6. An automatic programming device which creates a machining program used in a wire electric discharge machine that relatively moves a wire electrode containing brass and a workpiece to machine the workpiece by electric discharge produced between the wire electrode and the workpiece, the automatic programming device configured to:

input a machining shape;

obtain an intersection of a straight line and a straight line, an intersection of a straight line and a curved line, or a point at which curvatures in front and behind thereof vary, from the input machining shape, and to set an attachment/deposition region in which machining chips containing brass produced during machining are attached and deposited to the workpiece at a position on a machining path at a predetermined distance away from at least any one of such an intersection or a point thus obtained; and generate the machining program in which the set attachment/deposition region is taken into consideration.

7. A wire electric discharge machine which relatively moves a wire electrode containing brass and a workpiece in accordance with a machining program to machine the workpiece by electric discharge produced between the wire electrode and the workpiece, the wire electric discharge machine configured to:

set an attachment/deposition region in which machining chips containing brass produced during machining are attached and deposited to the workpiece, for each predetermined distance from an approach block finishing position of the machining program; and attach and deposit machining chips containing brass produced during machining to the workpiece according to the set attachment/deposition region, wherein the wire electric discharge machine is configured to create a new machining program by adding the set attachment/deposition region to the machining program, or by substituting said set attachment/deposition region for a corresponding portion of the machining program.

\* \* \* \* \*